United States Patent

[11] 3,589,327

| [72] | Inventor | Harold Jacobs |
| | | 6750 West Grand Ave., Chicago, Ill. 60035 |
| [21] | Appl. No. | 853,270 |
| [22] | Filed | Aug. 27, 1969 |
| [45] | Patented | June 29, 1971 |

[54] PORTABLE PILOT AID DEVICE
19 Claims, 3 Drawing Figs.

[52] U.S. Cl. .................................................. 116/29,
35/10.2, 346/8, 235/150.27, 116/135, 340/24
[51] Int. Cl. ............................................... B60k 35/00,
B64d 43/00
[50] Field of Search ......................................... 35/10.2, 12
A, 12 B, 12 F; 116/29, 135; 73/178; 346/8;
235/150, 27; 340/22—24

[56] References Cited
UNITED STATES PATENTS

| 11,082 | 6/1854 | Potter | 116/29 |
| 1,680,200 | 8/1928 | Blancafort | 116/29 |
| 1,916,734 | 7/1933 | Logan | 116/29 |

Primary Examiner—Malcolm A. Morrison
Assistant Examiner—R. Stephen Dildine, Jr.
Attorney—Wallenstein, Spangenberg, Hattis & Strampel ABSTRACT: A portable pilot aid device has a frame formed by two confronting members hinged together along one side thereof and resiliently urged together to form a clamplike structure adapted to receive a folded navigation map in any selected orientation so a particular selected flight path which the pilot is to fly is conveniently positioned be viewed by the pilot. The selected flight path on the map is positioned parallel to the path of movement of a power driven visible marker which represents the aircraft and moves parallel to the selected flight path on the map. Means are provided to adjust the speed of movement of the marker so its movement relative to the parallel flight path on the map corresponds to the movement of the aircraft over the ground. The marker is at a zero mileage point on a continuously moving endless belt which has mile markers formed thereon indicating the distance from the marker in miles to any point along the path of movement of the marker relative to the scale of the map involved. The pilot aid device is strapped to the pilots knee when in use to hold the chart in a convenient location in front of the pilot.

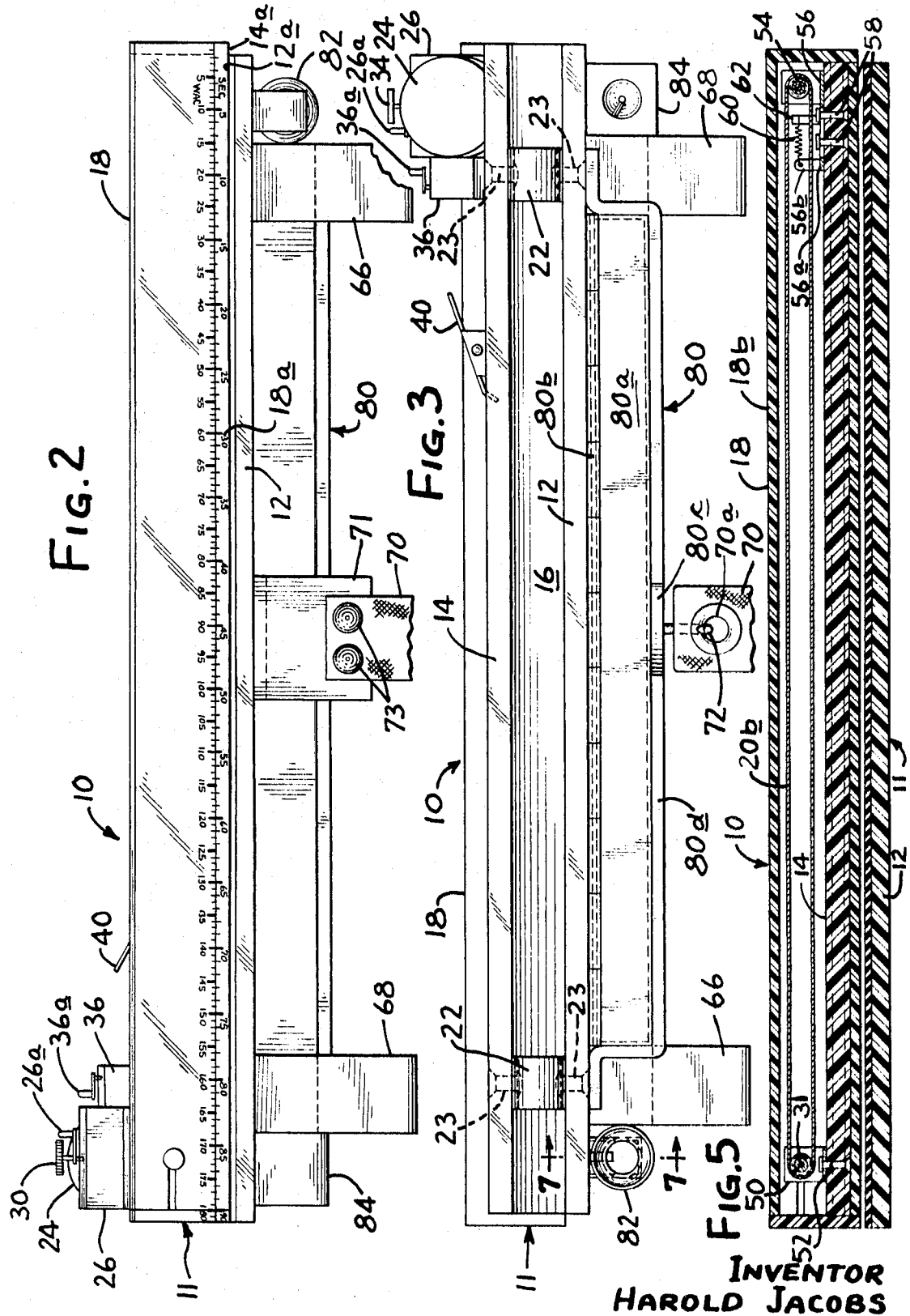

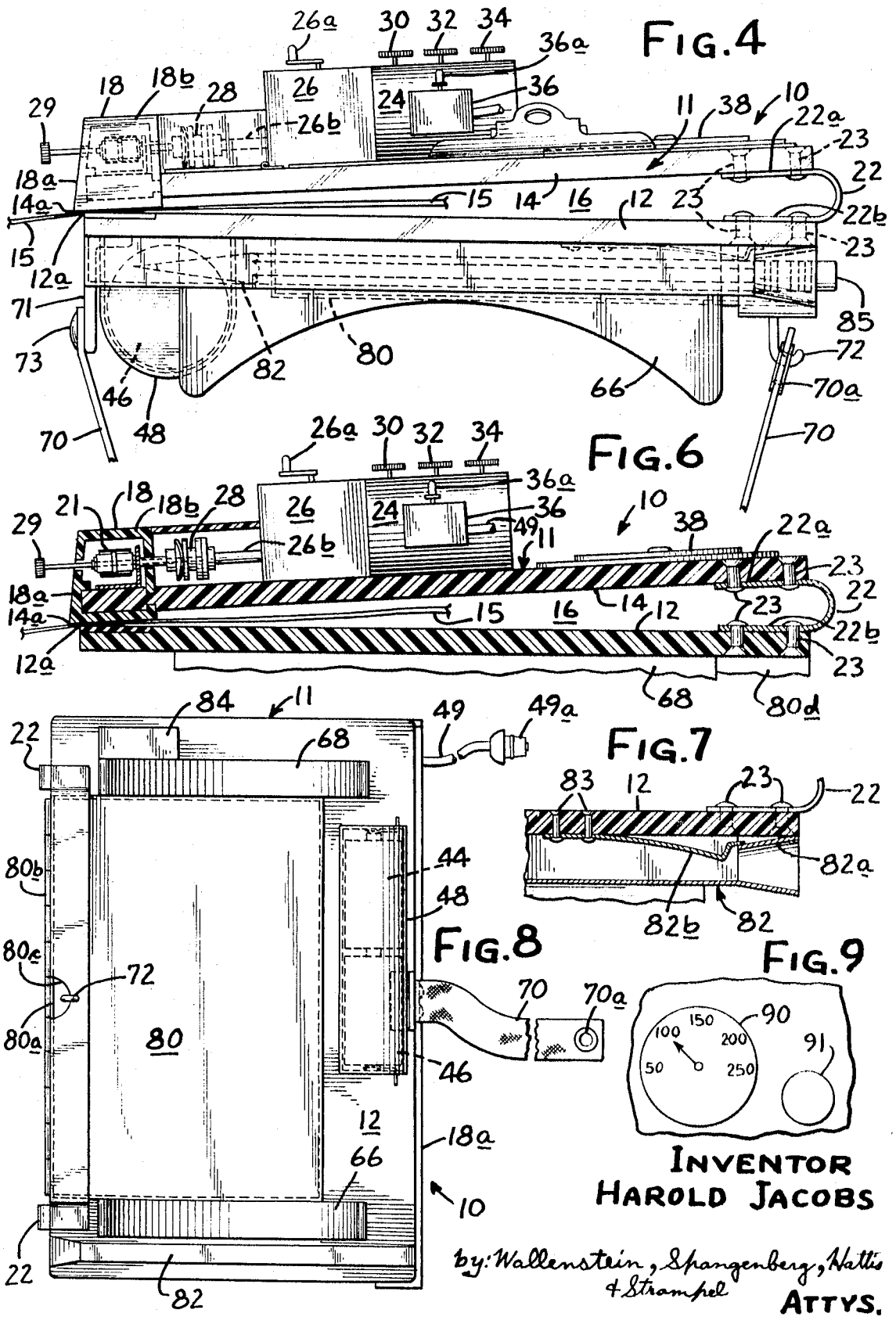

PORTABLE PILOT AID DEVICE

This invention relates generally to a pilot aid device for use by most private airplane pilots which allows a pilot at all times to know his position along a given flight path and, more particularly to a lightweight portable pilot aid device which can be used with standard aeronautical maps which are easily inserted into the device.

In the piloting of aircrafts over relatively long distances, it is common to break the overall flight into flight path segments each extending between cities or ground points having omnirange transmitting stations which can be tuned in on an omnirange receiver navigation unit within the plane which has an indicator which, by operating the aircraft direction controls, can be kept centered on a reference point to assure the pilot that the air craft will follow a substantially straight flight path between the omniranges involved. Also, the pilot can fly a straight path by making calculation of wind speed and direction and placing the aircraft on a heading which will compensate for the wind conditions encountered, thus, eliminating the need for a flight path direction system such as omni. In either case, it is of course essential for a pilot to know his position at all times along a given flight path segment. Relatively inexperienced pilots flying on visual flight rules especially need the security of knowing their position at all times. Therefore, such pilots generally maintain a constant vigil for known landmarks which are indicated on an aeronautical map. These maps are of two general types, one type being world aeronautical maps, sometimes referred to as W.A.C., maps which show a relatively large area of the region over which the pilot is flying and the other type being sectional maps which show a smaller area of the region but on an enlarged scale. The sectional maps are exactly twice the scale of the W.A.C. maps. These maps have marked thereon landmarks which are clearly visible to pilots flying at the prescribed altitudes to assist the pilots in their navigation. But under conditions of poor visibility caused, for example, by cloud cover beneath the aircraft, or night flying, or when flying over unrecognizable terrain such as large bodies of water, desert, or forest, it is difficult to determine an exact position along the flight path.

Where there are no readily visible landmarks over long distances, most pilots flying on visible flight rules will estimate their approximate position by trying to keep track of his ground speed and time in flight, but this is a time consuming burdensome task especially when a pilot has many other duties to perform, particularly in adverse weather conditions.

Although various pilot aid devices indicating the relative position of an airplane to a map section have been heretofore developed such devices are not useful with today's modern standard navigation ground maps published by the U.S. Department of economical and are costly and cumbersome to use. These devices all encompass the use of scroll type maps which individually cover only one flight path between two popular cities, necessitating the buying of many different route charts which would soon become obsolete. Also, they offer no help when a pilot has to change his course or destination due to bad weather because of its limited width. Today's maps are updated approximately every six months to indicate changes in airports, frequencies, navigational aids, obstacles and landmarks and are economically priced. These universally accepted maps are available at any airport or aviation supply establishment whereas the aforementioned inventions where maps used in these pilot aid devices are only available from the manufacturer or its agents.

Accordingly, one of the objects of this invention is to provide a pilot aid device to assist a pilot in keeping track of his position along any given flight path segment and which is of more simple and economical construction than the prior art devices so it can be economically afforded by practically all private plane pilots.

Another object of this invention is to provide a pilot aid device which can receive standard U.S. Commerce aeronautical maps in any selected orientation so that a particular flight path segment represented thereon can be visibly maintained in position parallel to a mileage scale on the device.

A further object of this invention is to provide a pilot aid device as described which readily indicates to the pilot by an airplane indicating marker the position of the aircraft relative to a selected flight path segment on a W.A.C. map or a sectional map.

A still further object of this invention is to provide a pilot aid device as described which will readily indicate to the pilot the distance already travelled from any given point as well as the distance to be travelled to any given point along his flight path in a range, for example, of 100 to 400 miles, using the W.A.C. map.

Briefly, the preferred form of the pilot aid device of this invention is a lightweight portable structure, most advantageously a knee supported frame which may comprise confronting upper and lower frame members forming a clamplike structure between which a W.A.C. or sectional map can be supported at any desired position covering 360° to bring a flight path segment into visible position along the path of movement of an airplane marker mounted on the frame. The upper and lower frame members are preferably resiliently hinged along corresponding longitudinal edges thereof resiliently to urge the opposite longitudinal edges together to clamp in place a map inserted between the frame members. However, other map holding means may be provided in accordance with a broad aspect of the invention. The airplane marker and the selected flight path segment are visible to the pilot. The map is oriented so that the direction of travel of the flight path segment extends in the same direction of travel as the aircraft, thus allowing the pilot easily to orient himself to the surrounding countryside, a very desirable aspect when flying. The pilot aid device of this invention is a time saving device which continuously and automatically indicates to the pilot the position of his aircraft along the flight path on the particular map being used, and, as such, is very useful in emergency situations. That is, when a pilot finds himself in a situation where time is of the essence, i.e. he must quickly find a place to land, the time consumed by the normal manual time-distance calculations heretofore required to determine his location now can be used for other essential operations.

The visible airplane marker may be a zero mileage marker on an endless belt having two mileage scales respectively for W.A.C. and sectional maps with the mileage indicated thereon increasing from zero in both directions along the scales. The endless band is driven by a variable speed drive mechanism, such as, for example, an electric motor either of the DC type or of the pulse stepping type, it being understood that spring powered mechanical escapements may be used without departing from this invention. A speed selector control is provided adjustably to select the speed of rotation of the drive mechanism so that the endless belt moves parallel to the selected flight path segment on the map at a speed relative thereto corresponding to the ground speed of the aircraft. The speed selector control preferably includes a two position speed adjustment control to provide a 2 to 1 speed ratio to take into account the type map used (W.A.C. or sectional) and a fine calibrated adjustment control means to provide a progressive speed adjustment to coincide with the established ground speed of the aircraft. Because of the arrangement of the mileage scales, the pilot can determine at a glance the distance he has already travelled from his last landmark check point as well as the distance to be travelled to the next landmark check point.

Where the pilot aid device of this invention incorporates an electrically operated drive mechanism, such as a DC or pulse step motor, electrical power therefor may be obtained either by a self-contained power pack such as batteries or by a power cable which has fitted at the free end thereof with a plug connector which is insertable into the cigarette lighter within the aircraft cabin so that the pilot aid device can received power directly from the aircraft, or if a cigarette lighter is not available, to any suitable wiring connection that will afford the desired voltage.

The pilot aid device of this invention also preferably includes a receptacle under the bottom frame member for receiving flight plans which are not being used but which are conveniently located for ready use at any time. Also, the upper frame member include clip holding means to hold an information sheet such as a flight plan sheet as desired, and there is also preferably provided on the upper frame member calculating means and a notation area adjacent the path of movement of the airplane marker on which the pilot may indicate various operations he is to perform at various points along the flight path segment involved, such as when to switch gas tanks, call a control tower, close flight plan, position report, or to operate certain controls within the plane.

Other features, objects and advantages of the pilot aid device of this invention will be more fully realized and understood from the following detailed description when taken in conjunction with the accompanying drawings wherein like reference numerals throughout the various views of the drawings are intended to designate similar components or elements. In the drawings:

FIG. 2 is a left side elevational view of the pilot and device of FIG. 1 showing W.A.C. and sectional scales along the openable left hand side thereof;

FIG. 3 is a right side elevational view of the pilot aid device of FIG. 1;

FIG. 4 is an end elevational view of the pilot aid device of FIG. 1 with a folded map in position within the device;

FIG. 5 is a sectional view of the pilot aid device of FIG. 1, taken along the section line 5–5 thereof;

FIG. 6 is a sectional view of the pilot aid device of FIG. 1, taken along the section lines 6–6 thereof with a folded map in position;

FIG. 7 is a fragmentary sectional view taken along the section line 7–7 of FIG. 3 showing the details of the pencil holder mounted on the pilot aid device;

FIG. 8 is a bottom reduced plan view of the pilot aid device of FIG. 1, showing a self-contained battery pack and a power cable either of which may be used to power an electric drive mechanism; and FIG. 9 is a fragmentary plan view of an alternate form of speed select and readout means which may be used on the pilot aid device in accordance with this invention.

Figure 1:
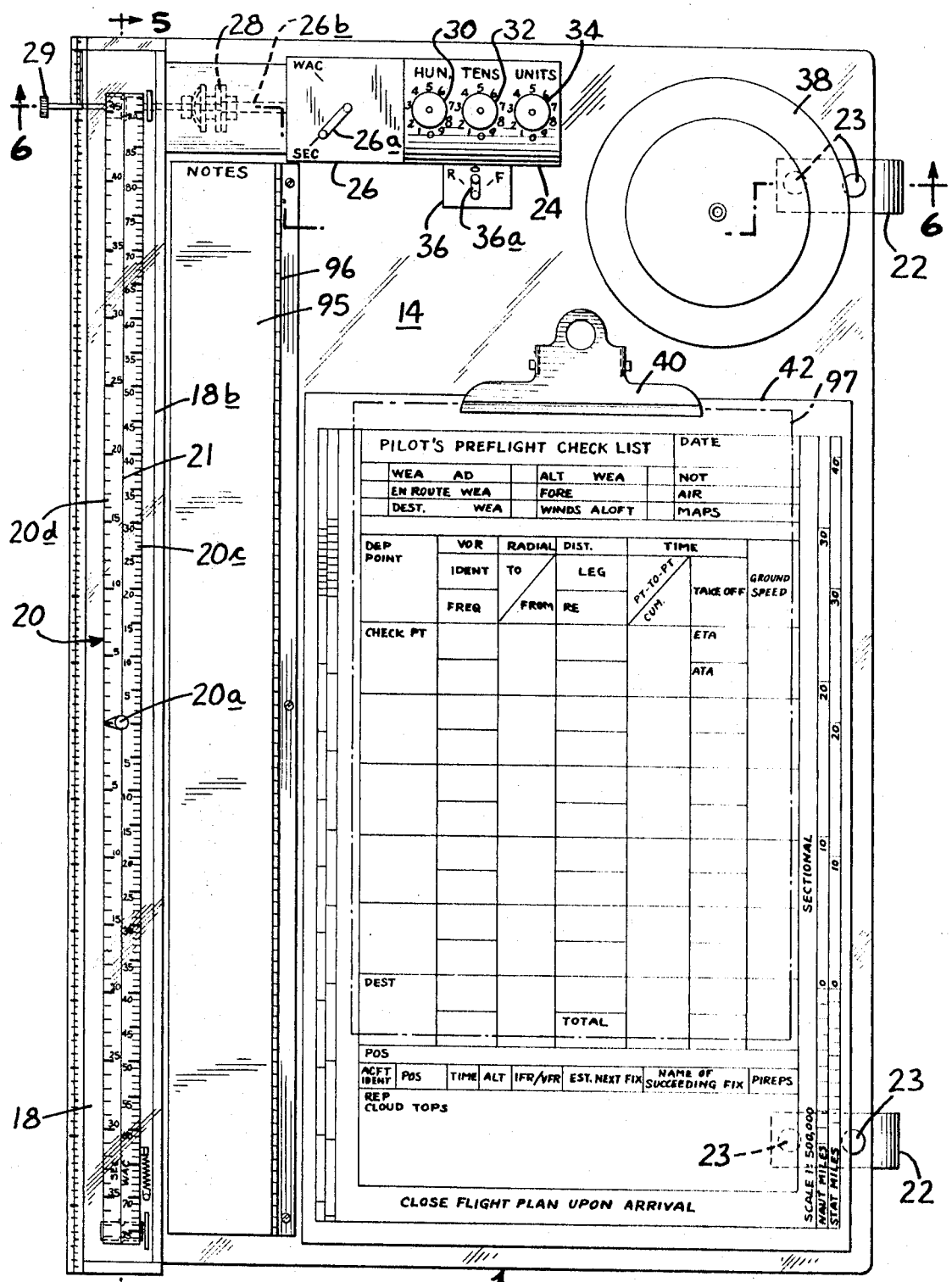
FIG. 1 is a top plan view of a pilot aid device constructed in accordance with the principles of this invention.

Referring now to FIGS. 1, 2, 3 and 4, there is seen a pilot aid device constructed in accordance with the principles of this invention and designated generally by reference numeral 10. The pilot aid device 10 preferably comprises a clamplike frame 11 including a bottom platelike member 12 of any suitable lightweight material such as wood or plastic and a top platelike member 14 preferably of lightweight transparent plastic material or the like positioned in registry with the bottom plate 12 and together therewith defining a space 16 therebetween for receiving a portion of an aeronautical chart or map 15 (FIGS. 4 and 6) which may be in a folded condition and inserted between openable gripping edge portions 12a and 14a along the left longitudinal side edges of the frame 11 firmly to hold the aeronautical map in a desired orientation. If desired, a strip 12b of gripping material may be fastened, as by glue, along the edge 12a to prevent slippage of the map while in the pilot aid device 10, it being understood that the strip of gripping material may be placed along the upper edge 14a. The end margins of the platelike members are open and unobstructed so the map 15 can extend beyond the left hand end margin of the frame 11 with a represented flight path or route, or flight segment thereof, placed outward of the left hand edge of the frame 11 to be in full view of the pilot. The gripping edge portions 12a and 14a are urged together by spring hinges 22–22 secured to the right longitudinal marginal portion of the platelike members 12 and 14. The illustrated spring hinges 22 are a pair of U-shaped spring steel members having extended portions 22a and 22b secured to the top and bottom platelike members 14 and 12, respectively, by means of rivets 23, it being understood that any suitable spring hinge means may be used.

The bottom and top platelike members 12 and 14 are easily manually separated to form an opening between the gripping portions 12a and 14a, respectively, to receive the aeronautical map 15 which is oriented with the represented flight path segment or route on the map positioned substantially parallel to and outwardly of a calabrated scale edge portion 18a of a narrow elongated housing 18 which is secured to the left edge portion of the platelike member 14 in which case the gripping portion 14a if formed by the bottom of the housing 18. At last the top wall 18b of the housing 18 is transparent so that a movable visible airplane marker 20, which is encased by the housing 18, is readily visible to the pilot when the pilot aid device is in use. Preferably, the movable marker 20 includes a pointer or reference mark 20 a formed on a movable endless band or belt 21 which extends parallel to and extends substantially the entire length of the left edge portion 18a of the housing 18. The represented flight path on the map 15 supported in the frame 11 is positioned so the desired flight path segment extends along the edge portion 18aof the housing 10 so the pointer 20a of the airplane marker is positioned near the flight path segment so movement of the marker relative to the represented flight path segment on the map 15 at a speed representative of the ground speed of the aircraft will indicate to the pilot at all times his position on the leg of the flight being flown.

To drive the endless band 21 at a rate of speed relative to the scale of the flight path or route on the chart so its movement corresponding to the rate of speed of the aircraft over the ground, a variable speed drive mechanism 24 has a rotatable output shaft thereof connected to a gear reducer 26 which provides manual selection, by means of a lever 26a, of two gear ratios which differ by ratio of two to one to compensate for the two different types of aeronautical maps that can be used in the pilot aid device 10. The output shaft 26b of the gear reducer 26 is coupled to the endless band 21 by means of a manually operated friction clutch mechanism 28 connected to a manual adjusting knob 29. The friction clutch mechanism 28 is sufficiently frictionally locked together to prevent any slippage between the output shaft 26b of the gear reducer 26 and a small drive wheel 31, FIG. 5, which engages and drives the endless band 21. This prevents slippage or loss of motion between the drive mechanism 24 and the endless band 21 to ensure that the rate of movement of the band 21 is constant and accurate. However, by manual operation of the adjusting knob 29, to manually position the pointer 20a on the endless band 21 to the desired position, the clutch mechanism 28 slips due to the increased force needed to rotate the output shaft of the gear reducer as a result of the step-up gear ratio when operating the gear reducer in the reverse fashion, i.e. using the output shaft of the gear reducer as the input shaft thereof requires more force.

After takeoff, the pilot makes an initial check to determine his actual ground speed between two points. After determining the aircraft's ground speed, the pilot than manually sets the pointer 20a by means of the adjusting knob 29 so that the pointer 20a by means of the adjusting knob 29 so that the pointer 20a represents the than existing actual position of the aircraft on the flight route represented on the map. The pilot than manually adjusts a plurality of speed selector and readout knobs 30, 32, and 34 which indicate rates of movement of the endless band 20b in increments of hundredths, tens and units, respectively. For example, the pilot can make a setting of 172 miles per hour on the selector knobs 30, 32, and 34 which adjusts the rate of movement of the endless band 21 to correspond to a rate of 172 miles per hour relative to the scale on the aeronautical map being used. Also, if after another flight check of ground speed it is determined that the ground speed is different than the setting on the dials 30, 32 and 34, a simple adjustment can be made to set the accurate rate of movement of the endless belt 21 to correspond to the new ground speed, which may have changed because of changes in wind, and to manually adjust the position of the pointer 20a slightly forward or slightly backward to the than existing exact position of the aircraft by means of the manual adjusting knob 29.

FIG. 9 illustrates an alternate form of speed selector and readout means which can be used with this invention to control the rate of advance of the endless band 21. Here a small tachometer 90 is used and has means for connection to the output shaft of either the drive mechanism 24 or the gear reducer 26 to sense the rate of rotation of the selected output shaft. The tachometer preferably is calibrated in miles per hour so that the pointer 90a indicates the relative speed of the marker 20a. A control knob 91 is than provided to adjust the amount of electric power applied to the drive motor 24, either the voltage amplitude or the number of pulses per second, to vary the speed thereof depending on the type of electric motor used.

Therefore, when using pilot aid device of this invention, the pilot need only look along the endless band 21 within the housing 18 to determine the position of the marker 20a relative to the flight route on the map to know his approximate position between the two points. To assist the pilot in determining the miles already travelled from a previous point, which may be a visual landmark, mile markers 20c and 20d, representing the scales of the two types of maps used are formed on the endless band 21 and extend in both directions from the reference mark 20a. Not only will the mile markers indicate to the pilot the distance already travelled from the last point on the flight path but also will indicate to the pilot the number of miles to be travelled to the next landmark or point on the flight route. This is a very important feature for pilot's travelling cross-country from one city to the next because it indicates to the pilot, by means of a simple calculation, the number of miles he must fly before he can expect to sight the next landmark or ground reference point.

The pilot aid device of this invention has an advantageous feature in that the direction of the flight route represented on the map can be orientated in the same direction as the actual path of the aircraft so that the pilot can easily identify landmarks seen from the air with those indicated on the aeronautical map. That is, landmarks on the map as being left of the flight route will be looked for and observed left of the actual flight path and landmarks to the right of the represented flight route will be looked for and observed to the right of the actual flight path. However, if the pilot is to make a return trip from whence he came he need not remove the map and turn it around if he desires not to do so because the drive mechanism 24 is provided with a forward reverse selector switch means 36 which has a manually operable lever 36a which can be moved between forward and reverse positions as well as an off position. Therefore, if desired, the pilot need only manually switch the position of the lever 36a to the reverse position and the endless band 21 will move in the reverse direction.

When the drive mechanism 24 is an electric motor it may be powered by a self-contained battery supply here indicated by a pair of series connected batteries 44 and 46 held within a battery receiving housing 48 mounted to the underside of the bottom plate 12, as best seen in FIGS. 4 and 8. However, the electric power for the electric motor may be obtained through the aircraft's power supply by means of a power cable 49 which as a plug 49a connected to the free end thereof which is adapted to be inserted within the cigarette lighter receptacle located within the aircraft. However, because of variations in voltage in the aircraft power supply, resulting from variations in voltage regulation of a generator charging the aircraft's battery, it may be desirable to utilize a pulse type stepping motor operated from a variable frequency pulse source such as an oscillator or the like. This type of stepping motor is not affected by change in voltage but responds only to changes in the frequency of pulses applied thereto. It also offers no interference to VHF radio reception or transmission.

As seen, FIG. 5, the drive wheel 31 is rotatably supported by an L-shaped bracket 50 which is secured to the top plate 14 by means of a rivet 52 or the like. The other end of the endless band 21 is wrapped about an idler wheel 54 which is rotatably supported in a slidable bracket 56 which is guided by a pair of screws or rivets 58 which extend through a slot 56a in the bracket 56. A small upwardly extending portion 56b of the bracket 56 receives one end of a tension spring 60 which has the other end thereof secured to a stationary standoff 62. Therefore, the idler wheel 54 is urged in a direction away from the drive wheel 31 to maintain a constant tension on the endless band 21.

To assist the pilot in making the ground speed calculations there is provided a calculator 38 mounted to the upper surface of the top plate 14. This may be a conventional type calculator which is used by pilots and may be a circular slide rule type device having one scale calibrated in time and another scale calibrated in miles and yet a third scale which indicates miles per hours. Therefore, after the pilot has checked the distance on the map between two points and also clocked the time to fly between the two points, he can set this information into the calculator 38 to make the proper calculation of his actual ground speed in miles per hour. Also, mounted to the upper surface of the top plate 14 is a spring clip mechanism 40 which may hold a sheet of paper 42 such as the pilot's flight plan in a convenient position in front of the pilot. To observe the portion of the map under the transparent top plate 14 which is also under the sheet 42 the pilot merely lifts up the sheet 42 or completely removes it from the clip device 40.

A pair of contoured members 66 and 68, which may be padded, are secured to the underside of the bottom plate 12 to conform to the shape of the upper portion of the pilot's leg. An elastic belt 70 has one end thereof secured to a depending portion of 71 of the bottom plate 12 by means of rivets or screws 73 and has formed at the free end thereof an eyelet 70a which is engageable with a hook 72. The pilot aid device 10 is than placed on an upper portion of one of the pilot's legs and fastened in position by stretching the elastic belt 70 underneath the leg and around to the side thereof and fastened by the eyelet 70a and hook 72.

Mounted underneath the bottom plate 12 is a flight plan storage compartment 80 for storing a plurality of maps not hinged to one side of the compartment by means of an elongated hinge 80a and a finger receiving notch 80c is cut out of the bottom wall 80d of the compartment 80 to facilitate opening the access door 80a to remove or insert flight plans or papers within compartment 80. Also mounted on the underside of the bottom plate 12 is a pencil receiving receptacle 82, as best seen in FIG. 7, which comprises an inwardly tapered pencil receiving circular opening 82a and a spring member 82b secured to the bottom plate 12 by a pair of rivets 83. The spring member 82a securely holds a pencil 85, FIG. 4, or other writing instrument within the receptible 82 so it will not inadvertently fall out due to vibrations or the like. Mounted at the other end of the pilot aid device beneath the bottom plate 12 is a pencil sharpener 84, FIG. 3, which can be used to sharpen the pencil 85.

For convenience to the pilot there may be a notation section 95 formed on the upper surface of the top plate 12, FIG. 1, on which may be written information which is to remind the pilot to do something when the marker 20a is adjacent the particular notation on the section 95. Preferably the notation section 95 is fastened to the top plate 14 by a hinge 96 here shown and extending along one side of the notation section 95, but it may if desired, extend along the top thereof, to allow the pilot to lift it out of the way and view the portion of the map underneath it. Also, an area 97 shown in broken lines under the sheet of paper 42, may have permanently or removably formed thereon information which does not change, or changes at an infrequent rate, but which the pilot may use at infrequent intervals and, as such, he may not remember. The area 97 may contain information such as emergency frequencies and procedures, light signals for landing in case of radio failure, emergency maneuvers necessary to ascertain identification by surveillance radar, space to write in frequencies used frequently by individual pilots, Koch's chart which determines runway lengths necessary in different altitudes and temperatures, etc.

It will be understood that variations and modifications may be effected without departing from the spirit and scope of the novel concepts disclosed and claimed herein.

I claim:

1. A pilot aid device for receiving aeronautical maps to indicate to a pilot the approximate position of his aircraft along a given flight path represented on a particular map, comprising: a frame; visible marker means representing the aircraft supported on said frame for movement along a given path which simulates the flight path of the aircraft in which the device is used; manually controlled means for adjusting the position of said marker means to any position along said path; holding means for receiving and holding a selected aeronautical map in any one of a number of orientations where any one of a number of flight routes thereon to be flown between two points is clearly visible by the pilot and extends along said path of movement of said marker means; drive means connected to said marker means for moving said marker means along said selected flight route on the map at a rate relative to the map corresponding to a given ground speed of the aircraft; and means connected to said drive means selectively to adjust the rate of movement of said marker means so it corresponds to the actual ground speed of the aircraft.

2. The pilot aid device of claim 1 wherein there is associated and movable with said marker means a mileage scale with mileage indicating indicia increasing from zero in opposite directions from said marker means to indicate on the map the relative distances along the flight path from the aircraft to points both behind and ahead of the aircraft.

3. The pilot aid device of claim 1 wherein said marker means is a visible zero mileage reference point on a continuously moving endless belt.

4. The pilot aid device of claim 1 wherein said frame includes apaced apart members forming separable clamping jaws to receive an aeronautical map therebetween, said holding means including a portion of said spaced apart members which grippingly resiliently engage and holds the map inserted between said spaced apart member.

5. The pilot aid device of claim 4 wherein said frame members are platelike with the gripping portions thereof formed by mating edge portions thereof.

6. The pilot aid device of claim 1 wherein said frame includes a transparent platelike member forming the side of device which faces the pilot thereby allowing the pilot to see that portions of the map which is inserted into the frame.

7. The pilot aid device of claim 1 wherein said frame includes a writing surface thereon extending in the direction of movement of said marker means and adjacent thereto upon which the pilot can make notations of information to be used when the marker means moves in position next to the notations.

8. The pilot aid device of claim 7 wherein said writing surface is fastened to said frame by hinge means to allow the pilot to lift the writing surface out of the way to view a portion of the map which is located beneath said writing surface.

9. The pilot aid device of claim 1 wherein said frame includes a transparent platelike member forming the side of device which faces the pilot thereby allowing the pilot to see that portion of the map which is inserted into the frame and a spring clip mechanism secured to said platelike member to hold a sheet of paper to said platelike member which can be lifted out of the way without removing it from the spring clip mechanism to expose to the pilot the portion of the map which is otherwise covered by the sheet of paper.

10 The pilot aid device of claim 1 wherein said frame includes a storage compartment formed therein opposite the side thereof supporting the marker means.

11. The pilot aid device of claim 1 further including a calculator secured to said frame to assist the pilot in calculating the ground speed of the aircraft.

12. The pilot aid device of claim 1 further including a housing formed on said frame along the edge thereof adjacent the selected flight route on the map, said housing having a transparent portion, and said marker means is positioned within said housing to be visible to the pilot through the transparent portion thereof.

13. The pilot aid device of claim 1 wherein said frame includes contoured means shaped to fit partially about the upper portion of a leg of the pilot and a strap and strap lock means fastened to said frame securely but removable to hold the pilot aid device to the pilot's leg in front of him when in a sitting position.

14. The pilot aid device of claim 1 wherein said last mentioned means is a manual selector adjusting means including a manually adjustable corresponds and a readout means readily visible by the pilot to assist him in setting the rate of movement of the marker means so its speed relative to the map corresponds to the actual ground speed of the aircraft.

15. The pilot aid device of claim 14 wherein said readout means includes a tachometer unit coupled to said drive means for indicating the rate of rotation of an output shaft of said drive means, said tachometer unit having a numerical readout scale calibrated in miles per hour corresponding to the speed of said marker means relative to the scale of said map, and said manually adjustable control including means interconnected with said drive means to vary the speed thereof to vary the readout of said tachometer unit.

16. The pilot aid device of claim 14 wherein said readout means comprises at least three selector dials, one calibrated in hundreds, another calibrated in tens and the last calibrated in units so that the pilot can set the rate of movement of said marker means relative to the scale of the map by setting the appropriate selector dials to positions corresponding to the miles per hour of the ground speed of the aircraft.

17. The pilot aid device of claim 1 wherein said drive means includes means for selectively changing the rate of movement of said marker means to correspond to the scale of the map being used.

18. The pilot aid device of claim 1 including an area for writing information which a pilot would tend to forget.

19. The pilot aid device of claim 18 wherein said area is located alongside said given path of movement of said marker means.